United States Patent [19]

Bonnaud et al.

[11] 3,898,189

[45] Aug. 5, 1975

[54] PREPARATION IN AQUEOUS MEDIUM OF PULVERULVENT COMPOSITIONS OF VINYL CHLORIDE BASED POLYMERS AND COPOLYMERS FOR IMMEDIATE USE

[75] Inventors: Bernard Bonnaud, Sisteron; Yves Fagnoni, St. Auban, both of France

[73] Assignee: Rhone-Progil, Courbevoie, France

[22] Filed: Feb. 1, 1974

[21] Appl. No.: 438,748

[30] Foreign Application Priority Data
Feb. 2, 1973    France .............................. 73.03661

[52] U.S. Cl...... 260/17 R; 260/23 XA; 260/28.5 D; 260/29.6 RB; 260/34.2; 260/42.55; 260/42.56; 260/45.75 K; 260/45.7 P; 260/92.8 A; 260/897 C
[51] Int. Cl.².......................................... C08L 1/26
[58] Field of Search......... 260/28.5 D, 34.2, 92.8 A, 260/23 XA, 45.75 K, 45.7 P, 17 R, 897 C, 42.55, 42.56, 29.6 RB

[56] References Cited

UNITED STATES PATENTS

| | | | |
|---|---|---|---|
| 3,635,928 | 1/1972 | Thomas ......................... | 260/92.8 A |
| 3,637,571 | 1/1972 | Polovina ........................... | 260/34.2 |
| 3,664,978 | 5/1972 | Uraneck et al. .................... | 260/34.2 |
| 3,682,857 | 8/1972 | Harris et al. ....................... | 260/34.2 |

*Primary Examiner*—Melvyn I. Marquis

[57] ABSTRACT

The preparation in aqueous medium of pulverulent compositions of vinyl chloride based polymers and copolymers containing various additives for their use, in which the liquid additives and at least a part of the solid additives are introduced with mixing in the form of one or more finely divided aqueous dispersions of a homogeneous phase. The formed compositions are suitable, without intermediate treatment, for the fabrication of articles by molding, calendering, extrusion, blow molding, injection molding, and the like.

29 Claims, No Drawings

PREPARATION IN AQUEOUS MEDIUM OF PULVERULVENT COMPOSITIONS OF VINYL CHLORIDE BASED POLYMERS AND COPOLYMERS FOR IMMEDIATE USE

The present invention relates to a method for the preparation in an aqueous media of pulverulent compositions of polymers and copolymers based on vinyl chloride, which compositions are suitable, without other intermediate treatment, for use in transformation operations such as molding, calendering, extrusion, blow molding, injection and other treatments. The invention also relates to such compositions.

It is known to prepare, in aqueous media, pulverulent compositions of polymers and copolymers based on vinyl chloride, which compositions are suitable for use by introduction before, during or after the polymerization, of various additives which are necessary for practical use of the compositions such as stabilizers, plasticizers, lubricants, pigments, fillers and polymer modifying agents intended for example to facilitate use of the compositions, or to improve the resistance to shock, the separation of the compositions from the aqueous medium, and the drying of them.

These processes offer the advantage of not requiring treatment of the polymers and copolymers at elevated temperature. However, the existing processes have the disadvantage that it is necessary to work with heterogeneous pulverulent compositions. In fact, it is observed, under microscopic examination of these compositions, that the particles of various ingredients retain their individual character or are agglomerated in an irregular manner. As a result, articles subsequently prepared from these compositions are also heterogeneous. This source of heterogeneity is compounded by the risk of segregation during packing or storing and during transport of particles of different nature, a risk which is even greater when the particles are of different density or size.

It is an object of this invention to provide a process for achieving homogeneous pulverulent compositions substantially formed of particles of similar or identical composition and appearance.

The present invention provides a method of preparing pulverulent polymer or copolymer compositions, based on vinyl chloride, and suitable for immediate use, in which polymers and/or copolymers of vinyl chloride and the various additives necessary for their use, such as for example, stabilizers, plasticizers, lubricants, pigments, colorants, fillers, and polymer modifying agents, are mixed in an aqueous medium. Said compositions are then separated from the aqueous medium and dried, whereupon the liquid additives and at least a part of the fusible solid additives are introduced into the mixing zone which is maintained under agitation, in the form of one or more finely divided aqueous dispersions of a homogeneous phase.

Compositions made by a method according to the invention may contain at least 70% by weight of polymers and copolymers based on vinyl chloride.

The polymers and copolymers based on vinyl chloride per se for use in methods according to the invention, may be prepared by any known method; bulk polymerization or polymerization in suspension, fine suspension or in emulsion.

As polymer modifying agents which may be used, there may be mentioned methylpolymethacrylate; graft polymers and copolymers, such as styrene and acrylonitrile on polybutadiene or butadiene-styrene copolymer, styrene and methylmethacrylate on polybutadiene or butadiene-styrene copolymer, butadiene and acrylonitrile on a polymer or copolymer of vinyl chloride, vinyl chloride or ethylene vinyl acetate copolymer; the olefin copolymers and vinyl monomers such as ethylene vinyl acetate copolymers. The quantity of modifying agent used may vary from 0 to 30 parts by weight per 100 parts by weight of the vinyl chloride based polymer or copolymer.

The liquid additives may be pure liquid ingredients or solutions of solid ingredients in appropriate solvents generally as plasticizers. This category includes stabilizers for vinyl chloride based polymers and copolymers, such as the organic salts of tin and short chain metallic soaps; lubricants such as glycerol esters and oleic acid, esters of glycerol and ricinoleic acid; anti-oxidants, such as trinonylphenylphosphite; and plasticizers, such as dioctyl phthalate and epoxydized soya oil. The quantity of plasticizer used may vary from 0 to 10 parts by weight per 100 parts by weight of the vinyl chloride based polymer and/or copolymer.

The fusible solid additives may be lubricants, such as wax esters, natural waxes, polyethylene waxes, paraffin waxes, fatty acids, fatty alcohols, amines of fatty acids; stabilizers such as alphaphenylindole; and calcium hydroxystearate.

According to one aspect of the invention, each of the liquid additives and the fusible solid additives may be introduced separately into the mixing zone in the form of an aqueous finely divided dispersion of a homogeneous phase. It is, however, preferable to introduce them using a minimal number of aqueous dispersions prepared from a minimal number of homogeneous phases, the number being a function of the reciprocal miscibility of the additives. An advantageous way of carrying out a method of the invention is to introduce, into the mixing zone in the form of a finely divided aqueous dispersion of the homogeneous phase, all the solid fusible additives which are suitable for handling in this form, that is to say, capable on their own or as a mixture with at least one of the liquid additives or other solid fusible additives of giving a homogeneous phase which does not, in the molten state, have a viscosity which is too high.

A homogeneous phase is preferably obtained by heating the additives of which it is formed to temperatures which are generally of from 20° to 150°C. In a further aspect of the invention, to obtain a finely divided aqueous dispersion of the homogeneous phase for use in methods of the invention, it is advantageous first of all to obtain a pre-dispersion of said phase in an aqueous solution of a chemical dispersing agent which is inert to the additives to be dispersed, under vigorous agitation, at a temperature of from 20° to 100°C, then pass this pre-dispersion through a homogenizer, such as for example an ultrasonic or turbine homogenizer. As dispersing agents preferred for this purpose, there may be mentioned the non-ionic emulsifying agents such as alkylphenylpolyoxyethylenes, protective colloids such as methylcellulose and polyvinyl alcohol, copolymers of maleic anhydride and styrene which are partially neutralized by potassium, or sodium hydroxide. Preferably, such agents are used in a proportion of 0.2 to 20% by weight of the homogeneous phase to be dispersed. The concentration of homogeneous phase in the aqueous dispersion is usually from 10 to 40% by weight. To carry out the method of the invention, the droplets of the aqueous dispersion of homogeneous phase should preferably have a mean diameter within the range of 1 to 30 and more preferably 10 to 20 microns. It is advantageous, in some instances, continuously to prepare the aqueous dispersion of the homogeneous phase and immediately before use to limit to a minimum the possible phenomena of hydrolysis at an elevated temperature in the event that hydrolyzable additives are used.

According to a further aspect of the invention, the solid ingredients which may be used directly in the form of an aqueous dispersion, such as for example the polymers and copolymer based on vinyl chloride and the polymer modifying agents prepared in an aqueous medium, are advantageously introduced in this form into the mixing zone.

The solid ingredients which cannot, or should not, enter a homogeneous phase and which cannot be used directly in the form of an aqueous dispersion are introduced into the mixing zone either in the form of a master pulverulent mixture or as such after milling with the aid of an aqueous solution of a milling agent.

Introduction in the form of a master pulverulent mixture is particularly advantageous in the case of ingredients which are in the form of coarse particles having a wide grain size distribution or having a mean diameter generally greater than 40 microns. The master mixture of grain size close to that of the composition to be prepared is obtained by dry mixing said additives and a quantity from 5 to 20 times their weight of polymer or copolymer based on vinyl chloride, under high speed agitation and at a temperature generally from 50° to 130°C. There is included in this category lubricants, such as certain polyethylene waxes which, not being miscible with any of the liquid additives or other solid fusible additives and having a very high viscosity in the molten state, are difficult to add in the form of an aqueous dispersion which is finely divided of a homogeneous phase. It is also advantageous to introduce, in the form of a master mixture, the ingredients which are present in the form of very fine particles having a diameter generally less than 4 microns, such as colorants, because they are then fixed solidly to the particles of copolymer or polymer and cannot be accidentally eliminated during subsequent treatment. Among the ingredients which may be introduced in this way there may be included also certain pulverulent solid ingredients which are difficult to melt, such as the stablilzers and fillers as well as the polymers and copolymers themselves, particularly those based on vinyl chloride.

Regarding the order of introduction of the ingredients to the mixing zone, several arrangements are possible depending on whether or not the polymers or copolymers are introduced to the mixing zone in the form of a latex, and according to whether the latex is composed of polymers or copolymers which are sticking or non-sticking.

In the case where none of the polymers and copolymers are introduced in the form of a latex or in the case when all the polymers or copolymers are introduced in the form of a latex, the feeding of all the ingredients to the mixing zone, which is maintained under agitation, may be carried out by introducing the ingredients simultaneously or successively and in an arbitrary order.

In the case where polymers or copolymers are introduced in part in the form of a latex, certain precautions should be observed concerning the point of introduction of the latex, according to whether the latter are composed of polymers or copolymers which are sticking or non-sticking. The introduction into the mixing zone of latexes of polymers or copolymers which are sticking, indicated hereinafter by the letter A, may be performed before, during or after the mixing operation for the other ingredients but preferably before. On the other hand, the introduction of latexes of polymers or copolymers which are non-sticking, indicated hereinafter by the letter B, should be performed at the end of the mixing operation for the other ingredients in order to obtain a homogeneous composition.

The non-sticking polymers and copolymers are defined as polymers of copolymers which do not tend to agglomerate. By a non-sticking polymer is to be understood any polymer or copolymer of which the second order transition temperature (vitreous transition Tg according to R. F. Bayer, R. S. Spencer Advances in Colloids Science 2-Interscience) is higher than 0°C, and preferably higher than 30°C, and of which the elasticity modulus contraction (Standard ASTM D638-61T) is above 1000 kg/cm$^2$ and preferably above 10000 kg/cm$^2$.

The non-sticking polymers and copolymers include polyvinyl chloride, polymethyl methacrylate; graft polymers and copolymers such as styrene and acrylonitrile on polybutadiene or butadiene styrene copolymer; styrene and methylmethacrylate on polybutadiene or butadiene styrene copolymer, vinyl chloride on ethylene vinylacetate copolymer; the olefinic copolymers and vinyl monomers such as ethylene vinyl acetate copolymers.

The sticking polymers include polymers obtained by grafting in an emulsion of a diene monomer, which may be substituted with at least one vinyl monomer, onto a chain of a polymer or copolymer of vinyl chloride. This is the result for example of polymers obtained by grafting butadiene and acrylonitrile on polyvinyl chloride.

In order to avoid the possible phenomenon of hydrolysis of certain additives, it may be of advantage to form the mixture in an aqueous medium maintained at a pH of about 7, as by the addition of ammonia.

The mixing operation is carried out in practice in the vessel (which may be an autoclave) which has served for the preparation of polymers or copolymers intended for the preparation of the composition according to the invention.

In the case where at least a part of the polymers or copolymers, which are used, are not introduced in the form of a latex but have been prepared by polymerization in aqueous suspension or in bulk, and because of this have the usual granulometry of these types of resin, the concentration of dry matter in the aqueous medium is adjusted, if necessary, by the addition of water, generally to 20 to 40% and preferably between 25 and 35% by weight. During the mixing operation, the temperature of the aqueous medium is maintained from 20° to 90°C and preferably 25° to 60°C, if necessary by heating, as by the injection of steam. In this case, it is advantageous to carry out the mixing operation under agitation with a higher degree of turbulence. It has been discovered that, under the influence of repeated impact caused by such agitation, the particles in the aqueous dispersion of the homogeneous phase become fixed in an irreversible manner on the grains of polymer or copolymer prepared by suspension or bulk polymerization, consequently with a large momentary thickening of the medium subject to agitation. It is also of advantage, in this case, to introduce into the mixing zone the latex of polymers or copolymers only at this stage, because the said latex disturbs the process of fixing described above and retard or suppress the phenomenon of thickening which results. The addition of latex also terminates this thickening and returns the fluidity of the medium, which is subject to agitation, to its original state. The end of the mixing operation is observed by taking a sample and examining it optically under a microscope. This examination shows that, when the operation is terminated, the particles obtained are made up of particles of polymers and copolymers prepared by polymerization in suspension or in bulk, on which are fixed other particles with the exception, however, of part of the particles making up latex A which may be used. Other things being equal, the more duration of a mixing operation is increased, the more the concentration of dry matter in aqueous medium is weakened, the speed of agitation lower and the temperature lower. For example, the duration may vary from about 2 minutes to about 2 hours according to the operating conditions used.

When the mixing operation is terminated, it is possible, after dilution (if required), either to coagulate particles of latex A which are not fixed onto the particles of polymers or copolymers prepared by suspension or bulk polymerization, by addition of a solution of a coagulating agent, or to add further latex A and effect its coagulation, or to introduce (if the case requires it) latex B which is also coagulated by addition of a solution of a coagulating agent. The addition of further latex A and latex B to the aqueous medium may be carried out simultaneously or successively and the order of addition is not significant. A coagulation can also be carried out simultaneously or successively. However, it is important that the final coagulation operation is carried out substantially on latex B, otherwise the particles obtained have a sticking tendency which causes agglomeration during separation from the aqueous medium, also during storage, and during use of the final dried composition. By microscopic examination, it may be seen that, during the successive coagulations, the particles of the various latexes which are used are equally fixed onto the particles of polymers and copolymers prepared by suspension or bulk polymerization.

The aqueous composition is then subjected to heat treatment which consists of heating, with agitation, to a temperature from 60° to 100°C, generally by injection of steam, for 2 to 60 minutes. The duration of this treatment may advantageously be reduced by continuously operating to limit the possible occurrence of hydrolysis. The thermal treatment, which facilitates the final elimination of the aqueous phase, also has the effect of causing the additives to penetrate to the interior of the particles of polymer or copolymer on which they become fixed and thereby to improve the mixture. Thus, after separation from the liquid medium, as by extraction and drying, this results in obtaining a homogeneous pulverulent composition which flows freely. In the absence of heat treatment, the composition obtained resembles mud, possessing poor flow properties.

In the case where all the polymers and copolymers used are introduced in the form of a latex, the concentration of dry matter in the aqueous medium, after the introduction of ingredients into the mixing zone, is generally from about 15 to 45% by weight. The mixing operation is practically instantaneous and is terminated at about the end of the introduction of the ingredients into the mixing zone. At this stage, all the particles are intimately mixed but retain their separate identity. It is then possible to subject the aqueous composition to an atomization operation, generally at a temperature from 55° to 110°C, or, possibly after dilution, to coagulate the latex by addition of a solution of a coagulating agent, subject to the aqueous composition to thermal treatment identical to that described for the case where at least a part of the polymers or copolymers are prepared by polymerization in suspension or in bulk, separate the composition from the aqueous liquid, for example by extraction, and then dry it. There is then obtained a homogeneous pulverulent composition which flows freely.

It is frequently advantageous to use coagulating agents which do not substantially modify the pH value of the aqueous medium, which in the case where hydrolyzable additives, such as for example calcium chloride are used, should remain at about 7. A proportion of from 0.2 to 5% by weight of coagulation agent, based on the amount of polymer and copolymer in the latex to be coagulated is generally used.

The compositions prepared by methods according to the invention are suitable for the manufacture of rigid articles by molding, calendering, injection, extrusion, blow molding, and especially for the manufacture by blow molding of hollow bodies, such as bottles which may be used for packaging foodstuffs, such as wine and mineral water.

Preferred embodiments of the invention will now be described with the aid of the following examples which are given by way of illustration, and not by way of limitation:

In Examples 1 to 11, a polymer S is used which is a vinyl chloride polymer prepared by polymerization in aqueous suspension. It is introduced into the mixing zone either in the form of an aqueous suspension having 31% by weight of dry matter, the form in which it is obtained, or in the form of a dry resin.

In Examples 12 to 17 all the polymers and copolymers used are introduced into the mixing zone in the form of latex. In the examples, polymer E is a vinyl chloride polymer in the form of the latex having 31% by weight of dry matter, prepared by polymerization in an aqueous emulsion.

The polymers S and E are polyvinyl chlorides of AFNOR index viscosity 80, determined according to Standard NFT 51013.

Examination under a microscope shows whether or not the pulverulent compositions obtained are homogeneous.

EXAMPLE 1

Into a vessel of 120 liters capacity, provided with an agitator having two horizontal arms of 300 mm length, rotating at 120 revolutions per minute there is introduced:

87 kg of the aqueous suspension of polymer S which has previously been cooled to 35°C
27 g of micro milled polyethylene wax
an aqueous dispersion of homogeneous phase which has been prepared in the following manner: In a melting pot at 110°C, a homogeneous phase is prepared by heating 1350 g of epoxydized soya oil, 54 g of zinc stearate, 80 g of calcium stearate, 108 g of alphaphenylindole and 540 g of glycerol monostearate/ This phase is vigorously agitated by means of a turbine of 30 mm diameter rotating at 6000 revolutions per minute and introduced into 5 kg of an aqueous solution, containing 0.25% by weight of a copolymer of maleic anhydride and styrene which has previously been neutralized by the addition of potassium hydroxide, said solution being heated to 85°C before use.

After 5 minutes of agitation, determination is made by examination under a microscope, that the mixing of the introduced ingredients is finished. There is then introduced into the vessel, 6.7 kg of a latex comprising 40% by weight of dry matter, a polymer obtained by grafting styrene and methyl methacrylate on polybutadiene, followed by 1 kg of aqueous solution containing 5% by weight of calcium chloride.

The contents of the vessel are heated to 90°C within 2 minutes by injection of steam, and then held for 5 minutes at this temperature and cooled to 60°C.

After extraction and drying of the prepared aqueous composition, there is obtained a homogeneous pulverulent composition which will flow freely.

It is known that the pulverulent composition obtained has a granulometry similar to that of polymer S. It follows that the operations of extraction and drying for the aqueous composition may be carried out in conventional industrial installations used for the recovery of vinyl chloride polymers prepared by polymerization in aqueous suspension.

The composition obtained is suitable, without intermediate treatment, for later transformation operations such as molding, calendering, extrusion, blow molding, injection, to yield rigid articles, resistant to shock, transparent and very slightly yellow in color.

EXAMPLE 2

This example is given for comparison purposes and not as representative of an embodiment of the invention.

The procedure of Example 1 is followed but the homogeneous phase is introduced into the vessel as it is, without preliminary dispersion in water.

After extraction and drying of the aqueous composition thus prepared, there is obtained a pulverulent composition having a heterogeneous structure as observed by the microscope.

The articles prepared by using a composition in conventional treatment machines are also heterogeneous.

EXAMPLE 3

This example is also given for comparison purposes.

The procedure in Example 1 is followed, but the additives, which in Example 1 form the homogeneous phase, are introduced as such into the vessel.

After extrating and drying of the aqueous composition thus obtained, there is obtained a heterogeneous pulverulent composition.

The articles prepared by using this composition in conventional forming machines are also heterogeneous.

EXAMPLE 4

The procedure of Example 1 is followed, but instead of introducing polymer S in the form of an aqueous suspension, it is introduced as it is to the vessel which already contains 60 kg of water and 36 g of polyvinyl acetate, which is partially hydrolyzed as a wetting agent.

There is obtained a composition having the same properties as that obtained in Example 1.

EXAMPLE 5

Into the vessel described in Example 1, with the agitator rotated at 120 rpm, there is introduced simultaneously:

87 kg of the aqueous suspension of polymer S previously cooled to 35°C.

30 g of micro milled polyethylene wax an aqueous dispersion of a homogeneous phase prepared in the following manner: In a melting pot at 110°C, a homogeneous phase is prepared by heating 1500 g of expoxidized soya oil, 60 g zinc stearate, 90 g of calcium stearate, 120 g of alphaphenylindole and 600 g of glycerol monostearate. Said phase is fed under vigorous agitation, obtained by means of a turbine of 30 mm diameter rotating at 6000 rpm, into 5.5 kg of an aqueous solution containing 0.25% by weight of a copolymer of maleic anhydride and styrene, which is partially hydrolyzed by potassium hydroxide, said solution having been previously heated to 85°C.

After 10 minutes of agitation it is observed, by microscopic examination, that the mixture of ingredients introduced in the vessel is finished. There is then successively introduced into the vessel:

8 kg of a 37.5% (dry matter) latex comprising a polymer obtained by grafting butadiene and acrylonitrile on polyvinyl chloride, 1.2 kg of an aqueous solution comprising 5% by weight calcium chloride, 9 kg of a 33% by weight latex of polyvinyl chloride, 1.2 kg of an aqueous solution containing 5% by weight calcium chloride.

The contents of the vessel are brought to 90°C in 2 minutes by injection of steam, held for 5 minutes at this temperature, and then cooled to 60°C.

After extraction and drying of the aqueous composition thus prepared, there is obtained a homogeneous pulverulent composition which will freely flow.

The same remarks apply to the properties of this composition as to that of Example 1.

EXAMPLE 6

The procedure of Example 5 is followed but a latex having 37.5% by weight (dry matter) polymer obtained by grafting of butadiene and acrylonitrile on polyvinyl chloride, is added at the same time as the aqueous suspension of polymer S, the micro milled polyethylene wax and aqueous dispersion of homogeneous phase.

There is then obtained a composition having the same properties as that obtained from Example 5.

EXAMPLE 7

Into the vessel described in Example 1 with the agitator rotating at 120 rpm, there is introduced:

87 kg of the aqueous suspension of polymer S previously cooled to 35°C, 540 g of a master coloring mixture prepared at 115°C in a high speed mixer and containing 475 g of polymer S, 55 g of oxidized polyethylene wax, and 10 g of a blue dye, an aqueous dispersion of a homogeneous phase prepared in the following manner: In a melting pot at 110°C there is prepared, by heating all the constituents, a homogeneous phase composed of 400 g of dioctyl tin bis-isooctyl-mercaptoacetate, 40 g of oxidized polyethylene wax and 70 g of glycerol trihydroxystearate. This homogeneous phase is added with vigorous agitation, obtained by means of a turbine of 30 mm diameter rotating at 6000 rpm, into 2 kg of an aqueous solution containing 2% by weight of sodium dioctylsulphosuccinate, said solution being previously heated to 80°C.

After 5 minutes of agitation, it is observed by microscopic examination that mixing of the introduced ingredients is completed. There is then introduced into the vessel, 7.5 kg of a latex comprising 40% by weight (dry weight) polymer obtained by grafting styrene and methylmethacrylate onto polybutadiene, then 1.2 kg of an aqueous solution containing 5% by weight calcium chloride.

The contents of the vessel are heated to 90°C by steam injection (within 2 minutes) and then maintained for 5 minutes at this temperature and subsequently cooled to 60°C.

After extraction and drying of aqueous composition which is thus prepared, there is obtained a homogeneous pulverulent composition which will freely flow.

The composition obtained is suitable for use directly in forming machines for obtaining rigid articles resistant to shock, of good transparency and lightly colored blue.

EXAMPLE 8

In the vessel described in Example 1 with the agitator rotating at 120 rpm there is introduced:

87 kg of the aqueous suspension of polymer S previously cooled to 60°C, 1500 g of a copolymer of vinyl chloride and vinyl acetate, containing 90% by weight of vinyl chloride and 10% of vinyl acetate and prepared by polymerization in aqueous suspension, a mixture consisting of 580 g of titanium dioxide, 30 g of micro milled polyethylene wax, 500 g of tribasic lead sulphate, and 100 g of dibasic lead phosphate wetted by 4 kg of an aqueous solution containing 0.4% by weight of sodium dioctylsulphosuccinate, an aqueous dispersion of a homogeneous phase prepared in the following manner: In a melting vessel at 110°C there is prepared, by heating the ingredients, a homogeneous phase composed of 50 g of stearic acid, 100 g of cetyl palmitate, 200 g of glycerol monostearate and 50 g of oxidized polyethylene wax. Said homogeneous phase was fed with vigorous agitation, obtained by means of a turbine of 30 mm diameter rotating at 6000 rpm into 1.5 kg of an aqueous solution containing 0.1% by weight of methylcellulose which had been previously heated to 90°C.

After 10 minutes of agitation, it is observed by microscopic examination that mixing of the ingredients is complete. There is then introduced successively into the vessel:

8 kg of a latex comprising 37.5% by weight (dry matter) of a polymer obtained by grafting butadiene and acrylonitrile onto polyvinyl chloride, 1.2 kg of an aqueous solution comprising 5% by weight calcium chloride, 9 kg of polyvinyl chloride latex comprising 33% by weight dry matter, 1.2 kg of an aqueous solution comprising 5% by weight calcium chloride.

The contents of the vessel are heated to 90°C within two minutes by injection of steam, held at this temperature for 5 minutes and then cooled to 60°C.

After extraction and drying of the aqueous composition which is thus prepared, there is obtained a homogeneous pulverulent composition which will flow freely.

The composition obtained may be used directly in forming machines for producing rigid articles which are resistant to shock, opaque and white in color.

EXAMPLE 9

The procedure of Example 8 is followed, but the introduction of the latex of the polymer obtained by grafting of butadiene and acrylonitrile onto polyvinyl chloride, is omitted together with the introduction of the first of the solutions of calcium chloride introduced in Example 8.

There is obtained a homogeneous pulverulent composition which will flow freely.

The composition obtained is suitable for direct use in forming machines for introducing rigid, opaque and white colored articles.

EXAMPLE 10

The procedure of Example 1 is followed, but with omission of the introduction of the polymer latex obtained by grafting styrene and methylmethacrylate on polybutadiene together with the introduction of the aqueous solution of calcium chloride.

A homogeneous pulverulent composition is obtained which will flow freely.

The composition obtained is suitable for direct use in forming machines for producing rigid transparent articles having a light yellow color.

EXAMPLE 11

Into the vessel described in Example 1 with the agitator rotating at 120 rpm there is introduced:

87 kg of the aqueous suspension of polymer S previously cooled to 60°C, a mixture consisting of 30 g of micro milled polyethylene wax, 500 g of tribasic lead sulphate and 100 g of dibasic lead phosphate, wetted by 3 kg of an aqueous solution containing 0.4% by weight of sodium dioctylsulphosuccinate, an aqueous dispersion of a homogeneous phase identical to that used in Example 8.

After 10 minutes of agitation it is observed by microscopic examination that the mixture of ingredients is complete.

The contents of the vessel are heated to 90°C within 2 minutes by injection of steam, held at this temperature for 5 minutes and then cooled to 60°C.

After extraction and drying of the aqueous composition thus prepared there is obtained a homogeneous pulverulent composition which will flow freely.

The composition obtained is suitable for direct use in forming machines for producing articles which are rigid, white in color and translucent.

EXAMPLE 12

Into the vessel described in Example 1 having an agitator rotating at 50 rpm there is introduced:
- 87 kg of a latex of polymer E previously cooled to 35°C,
- 27 g of micro milled polyethylene wax,
- an aqueous dispersion of homogeneous phase identical to that used in Example 1.

At the end of the introduction of the ingredients, it is observed that all the particles used are intimately mixed but retain their individual identity. The composition is then atomized at 90°C. A homogeneous pulverulent composition which will flow freely is obtained.

The composition obtained is suitable for use directly in forming machines to produce articles which are rigid, transparent and practically free from color.

EXAMPLE 13

This Example is given by way of comparison and not as an embodiment of the invention.

The procedure of Example 12 is followed, but the homogeneous phase is introduced as such into the vessel.

During mixture, it is observed that crusts were formed to a considerable extent surrounding a considerable part of the additives forming the homogeneous phase. These crusts interfere greatly with the later atomization operation. The pulverulent composition obtained is heterogeneous and unsuitable for use.

EXAMPLE 14

This example is also given by way of comparison and not as an embodiment of the invention.

The procedure of Example 12 is used but the additives, which in Example 12 form the homogeneous phase, are introduced as such into the vessel.

As in Example 13, the pulverulent composition obtained is heterogeneous and unsuitable for use.

EXAMPLE 15

In a vessel comparable to that described in Example 1 but of 300 liters capacity, having an agitator rotating at 50 rpm there is introduced:
- 87 kg of latex of polymer E, previously cooled to 35°C,
- 8 kg of a latex having 37.5% by weight of dry matter of a polymer obtained by grafting butadiene and acrylonitrile onto polyvinyl chloride,
- 27 g of micro milled polyethylene wax,
- an aqueous dispersion of a homogeneous phase identical to that used in Example 1.

At the end of the introduction of the ingredients, it is observed that all the particles used are intimately mixed but retain their individual identity. The composition is diluted by addition of 150 kg of water and there is then introduced into the vessel 12 kg of an aqueous solution containing 5% by weight of calcium chloride.

The contents of the vessel are heated within 2 minutes to 90°C by injection of steam, held at this temperature for 5 minutes and then cooled to 60°C.

After extraction and drying of the aqueous composition thus prepared, there is obtained a homogeneous pulverulent composition which will flow freely.

The composition is suitable for use directly in the forming machines for producing rigid articles which are resistant to shock and which have a slightly yellow color.

EXAMPLE 16

This example is given for comparison and not as an embodiment of the invention.

The procedure of Example 15 is followed but the homogeneous phase is introduced as such into the vessel.

During mixing, the formation of crusts is observed which enclose, to a large extent, a large part of the additives constituting the homogeneous phase, and which persist after coagulation.

After extraction and drying of the aqueous composition thus prepared, there is obtained a heterogeneous pulverulent composition.

The articles prepared using this composition in forming machines are also heterogeneous.

EXAMPLE 17

This example is also given for comparison and not as an embodiment of the invention.

The procedure of Example 15 is used, but the additives, which in Example 15 form the homogeneous phase, are introduced as such into the vessel.

As in Example 16, the pulverulent composition obtained is heterogeneous and the articles prepared using this composition in forming machines are also heterogeneous.

We claim:

1. A method of preparing pulverulent polymer or copolymer compositions based on vinyl chloride and suitable for immediate use, comprising mixing the polymers and/or copolymers of vinyl chloride and one or more additives necessary for their use, including stabilizers, plasticizers, lubricants, pigments, colorants and fillers in an aqueous medium, separating said compositions from the aqueous medium, and drying the separated composition, wherein the liquid additives and at least a part of the fusible solid additives are introduced into the mixing zone in the form of one or more finely divided aqueous dispersions of a homogeneous phase, and maintaining said material under agitation.

2. A method according to claim 1, wherein the quantity of plasticizers utilized varies from 0 to 10 parts by weight per 100 parts of polymer or copolymer based on vinyl chloride.

3. A method according to claim 1, wherein each of the liquid additives and the solid fusible additives are introduced separately into the mixing zone in the form of a finely divided aqueous dispersion of a homogeneous phase.

4. A method according to claim 1, wherein the liquid additives and the fusible solid additives are introduced into the mixing zone using a minimum number of aqueous dispersions prepared from a minimun number of homogeneous phases.

5. A method according to claim 1, wherein one or more of said homogeneous phases is obtained by a method including heating the additives which constitute it to a temperature in the range from 20° to 150°C.

6. A method according to claim 1, wherein there is introduced into the mixing zone, in the form of a finely divided aqueous dispersion of a homogeneous phase, all the fusible solid additives which are suitable for handling in that form.

7. A method according to claim 1, wherein the concentration in the homogeneous phases of one or more of said finely divided aqueous dispersions of the homogeneous phase is from 10 to 40% by weight.

8. A method according to claim 1, wherein the droplets of one or more of said finely divided aqueous dispersions of a homogeneous phase have a mean diameter of from 1 to 30 microns.

9. A method according to claim 8, wherein said droplets have a mean diameter of from 10 to 20 microns.

10. A method according to claim 1, wherein at least a part of the polymers and/or copolymers used have been prepared by aqueous suspension polymerization or in bulk and that, during said mixing, the mixing zone is maintained under agitation at high turbulence.

11. A method according to claim 1, wherein the whole of the polymers and/or copolymers used have been prepared by aqueous suspension polymerization or in bulk and after said mixing and before said separation from the liquid medium the aqueous composition is thermally treated under agitation at a temperature within the range of 60°–100°C and for a time within the range of 2–60 minutes.

12. A method according to claim 1, wherein at least a part of the polymers and/or copolymers used are introduced to the mixing zone in the form of a latex and after said mixing or after said mixing and dilution, there is added an aqueous solution of a coagulating agent, then subjecting the aqueous composition to thermal treatment under agitation before separation from the liquid medium at a temperature within the range of 60°–100°C and for a time within the range of 2–60 minutes.

13. A method according to claim 10 wherein the whole of the polymers and/or copolymers used are introduced to the mixing zone in the form of a latex and after said mixing the aqueous composition is subjected to atomization.

14. A method according to claim 13, wherein said atomization operation of the aqueous composition is carried out at a temperature of from 55° to 110°C.

15. A method according to claim 1 in which the liquid additives are selected from the group consisting of organic salts of tin, metallic soaps having a short chain length, esters of glycerol and oleic acid, esters of glycerol and recinoleic acid, trinonylphenylphosphite, dioctyl phthalate and epoxidized soya oil.

16. A method according to claim 1 in which the solid fusible additives are selected from the group comprising waxy esters, natural waxes, polyethylene waxes, paraffin waxes, fatty acids, fatty alcohols, amines of fatty acids, alphaphenylindol and calcium hydroxy stearate.

17. A method according to claim 1, wherein at least one nonionic emulsifier is used as a dispersing agent in an amount of 0.2 to 20% by weight of the homogeneous phase to be dispersed, in the preparation of one or more of said finely divided aqueous dispersions of homogeneous phase.

18. A method according to claim 17 wherein the nonionic emulsifier is selected from the alkyl phenol polyoxyethylenes.

19. A method according to claim 1 wherein at least one protective colloid is used as a dispersing agent in an amount of 0.2% to 20% by weight of the homogeneous phase to be dispersed, in the preparation of one or more of said finely divided aqueous dispersions of homogeneous phase.

20. A method according to claim 19, wherein the protective colloid is selected from methylcelluloses, polyvinyl alcohol and copolymer of maleic anhydride and of styrene partly neutralized by potassium or sodium hydroxide.

21. A method according to claim 1, wherein at least a part of the polymers and/or copolymers used have been prepared by aqueous suspension polymerization or in bulk and wherein the concentration of dry matter in the aqueous medium after the introduction of ingredients into the mixing zone is between 20 to 40% by weight.

22. A method according to claim 1, wherein at least a part of the polymers and/or copolymers used have been prepared by aqueous suspension polymerization or in bulk and wherein the concentration of dry matter in the aqueous medium after the introduction if ingredients into the mixing zone is between 25 and 35% by weight.

23. A method according to claim 1, wherein at least a part of the polymers and/or copolymers used have been prepared by aqueous suspension polymerization or in bulk and wherein, during the mixing operation, the temperature of the aqueous medium is maintained from 20° to 90°C.

24. A method according to claim 1, wherein at least a part of the polymers and/or copolymers used have been prepared by aqueous suspension polymerization or in bulk and wherein, during the mixing operation, the temperature of the aqueous medium is maintained from 25° to 60°C.

25. A method according to claim 1, wherein at least a part of the polymers and/or copolymers used have been prepared by aqueous suspension polymerization or in bulk and wherein, when the mixing operation is terminated, after eventual dilution, the particles of sticking latex which are not fixed onto the particles of polymers of copolymers prepared by suspension or bulk polymerization are coagulated by addition of a solution of a coagulating agent.

26. A method according to claim 1, wherein at least a part of the polymers and/or copolymers used have been prepared by aqueous suspension polymerization or in bulk and wherein, when the mixing operation is terminated, after eventual dilution, at least one sticking latex is added and its coagulation is effected.

27. A method according to claim 1, wherein at least a part of the polymers and/or copolymers used have been prepared by aqueous suspension polymerization or in bulk and wherein, when the mixing operation is terminated, after eventual dilution, at least one non-sticking latex is added to the aqueous medium and coagulated by addition of a solution of a coagulating agent.

28. A method according to claim 1, wherein at least a part of the polymers and/or copolymers used have been prepared by aqueous suspension polymerization or in bulk and wherein, when the mixing operation is terminated, after eventual dilution, at least one sticking latex and at least one non-sticking latex are added successively to the aqueous medium simultaneously or successively and in arbitrary order and their coagulation is carried out simultaneously or successively.

29. A method according to claim 1, wherein all the polymers and copolymers used are introduced to the mixing zone in the form of a latex and wherein the concentration of dry matter in the aqueous medium, after the introduction of ingredients into the mixing zone, is from about 15% to 45% by weight.

* * * * *